July 21, 1942.  W. P. STUCKERT  2,290,837
GLASS SEVERING APPARATUS
Filed Oct. 26, 1940  6 Sheets-Sheet 1

INVENTOR.
William P. Stuckert
BY Lawrence Burns,
ATTORNEY.

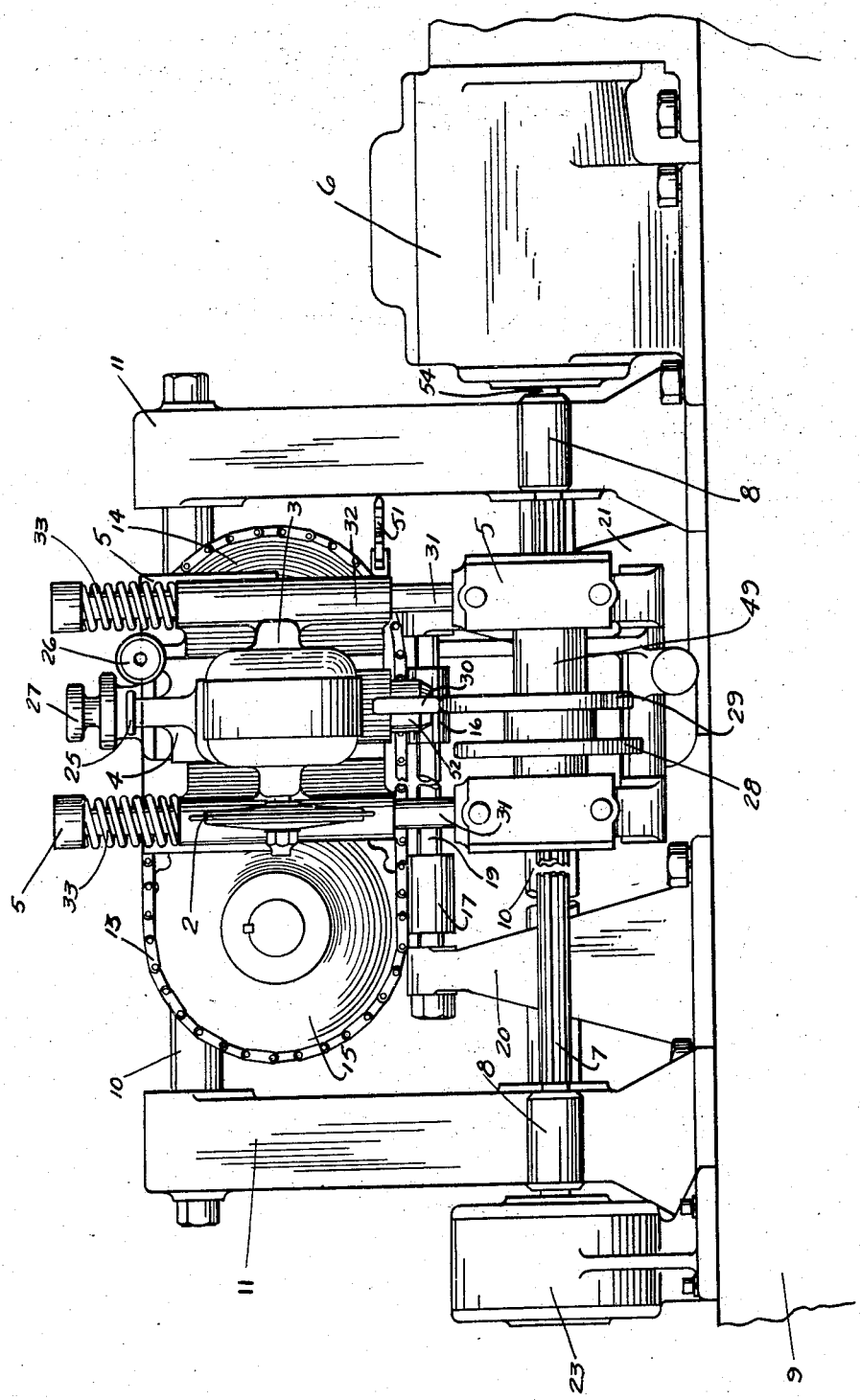

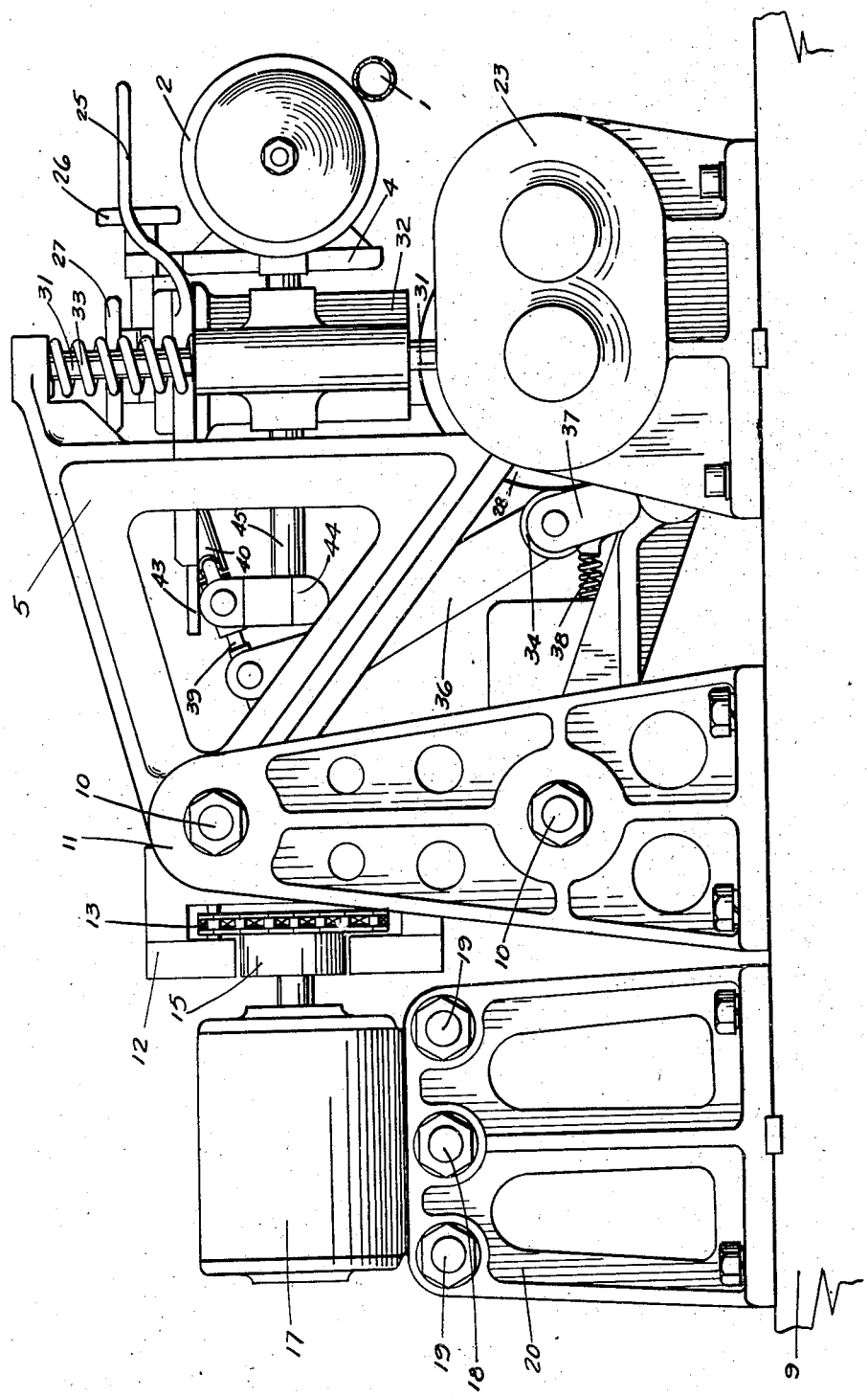

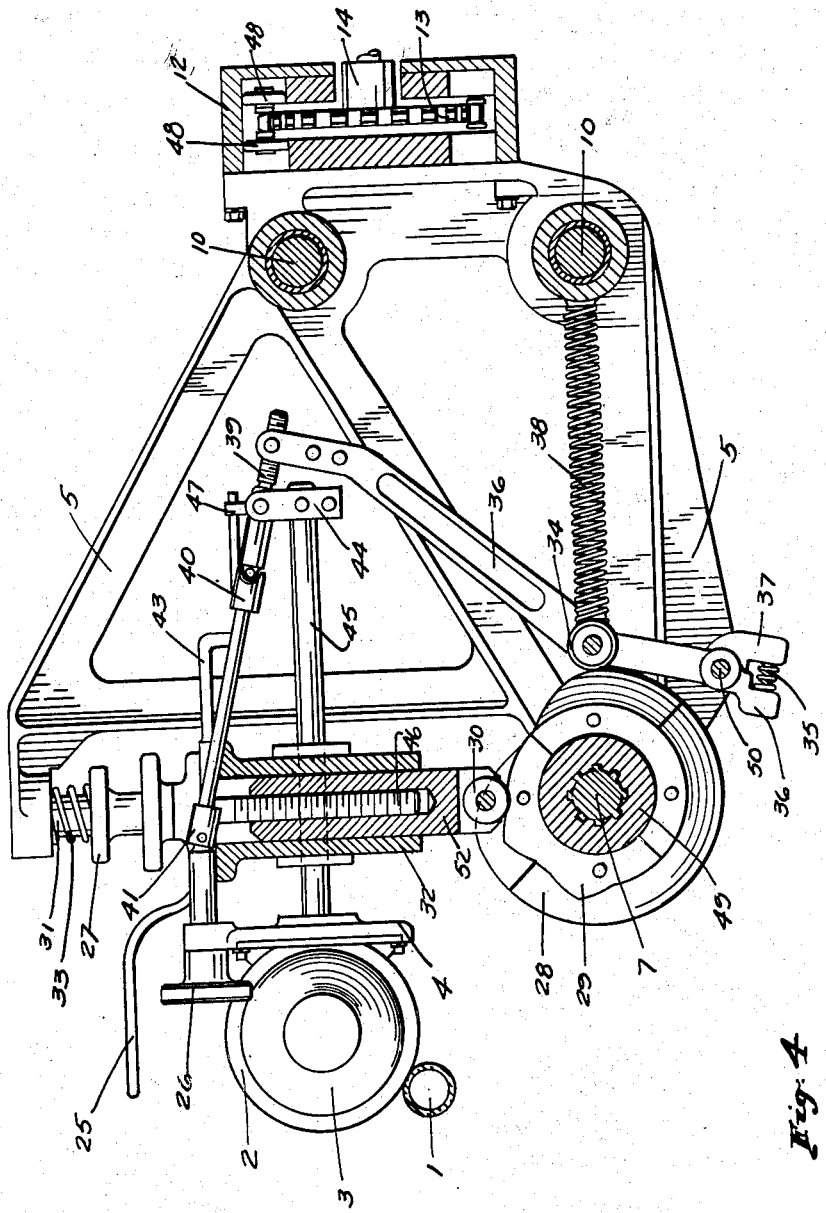

July 21, 1942.  W. P. STUCKERT  2,290,837
GLASS SEVERING APPARATUS
Filed Oct. 26, 1940  6 Sheets-Sheet 5
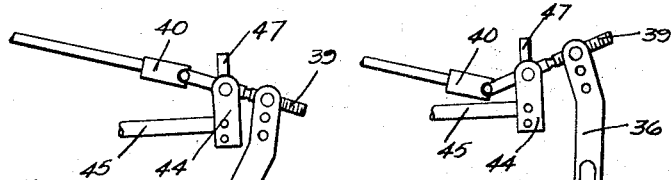
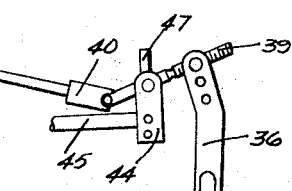
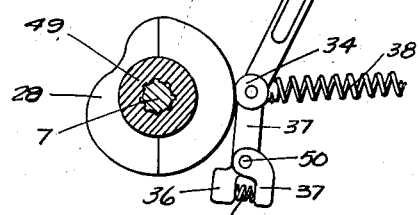
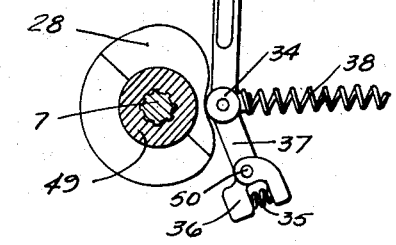
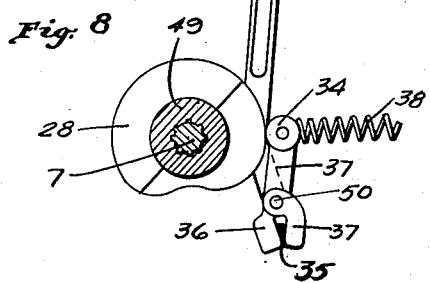
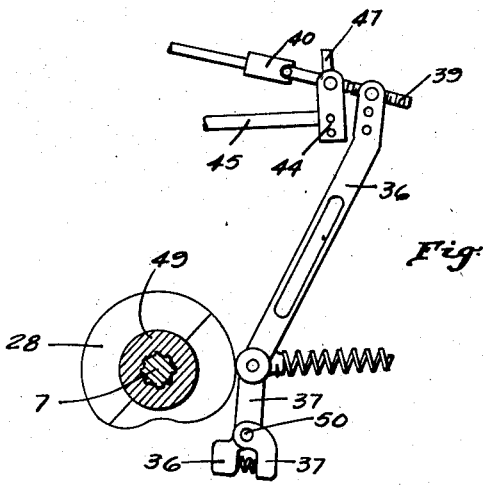
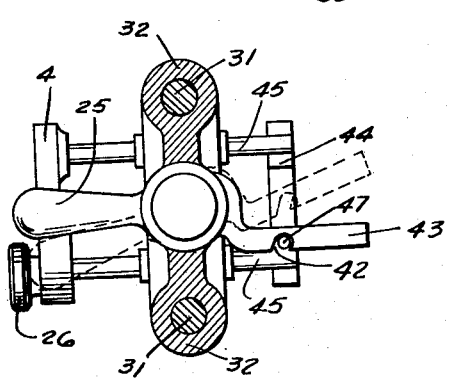
INVENTOR.
William P. Stuckert
BY
ATTORNEY.

INVENTOR.
William P. Stuckert
BY Lawrence Burns,
ATTORNEY.

Patented July 21, 1942

2,290,837

UNITED STATES PATENT OFFICE 2,290,837

GLASS SEVERING APPARATUS

William P. Stuckert, Marblehead, Mass., assignor to Hygrade Sylvania Corporation, Salem, Mass., a corporation of Massachusetts Application October 26, 1940, Serial No. 363,028

6 Claims. (Cl. 49—48)

This invention relates to the means of drawing molten material in cylindrical form and more particularly to the means of cutting glass tubing into desired lengths.

An object of this invention is to provide a means for cutting glass tubing that will give a more positive and a cleaner cut of the tubing when it is being cut into the desired lengths.

Another object of this invention is to provide a means for cutting glass tubing that will enable the cutting mechanism to accomplish the combination of a vertical and horizontal movement when it is cutting the tubing.

A further object is to provide a glass tubing machine that may readily be adapted to draw tubing of various lengths.

Further objects, advantages, and features will be apparent from the specifications below taken in conjunction with the accompanying drawings in which:

Figure 2 is a front elevational view of this apparatus.

Figure 3 is an end elevational view of this apparatus.

Fig. 4 is a detail of the cutter and cutter cam assembly.

Figure 5 is a detail of the horizontal cam assembly in its normal rearward position before cutting.

Figure 6 is a detail of the horizontal cam assembly in its normal forward position.

Figure 7 is a detail of the horizontal cam assembly in its normal rearward position after cutting.

Figure 8 is a detail of the horizontal cam assembly in its locked position.

Figure 9 is a schematic plan view partly in section showing the locking control in its locked position and having its normal unlocked operating position shown in phantom.

Similar reference characters refer to similar parts throughout the several views of the drawings.

This invention embodies certain improvements over the so-called Danner machine described in the Patent 1,220,201 issued to Edward Danner on March 27, 1917. Most glass tube drawing machines of the Danner type draw standard 48 inch lengths. When more than one length of tubing was desired, a separate machine was usually set up for each desired length or the one being used was reconstructed considerably to provide the new desired length. The cost and inconvenience of this is prohibitive to one who wishes to obtain substantially small quantities of tubing of several different lengths and diameters.

By employing the adjustable screw arrangement in this invention, a cut of any desired length may be obtained by sliding the adjustable housing. Formerly the cutting of the tubing was done by a horizontal motion of the cutter. In this invention, by employing a series of cams, the cutting mechanism accomplishes a combination horizontal and vertical movement, thus causing the cutting head to function in an arcuate manner. Cutting the tubing in this manner provides a clean and therefore more economical cut for it eliminates much of the breakage due to strains near the cutting point.

Figure 1:
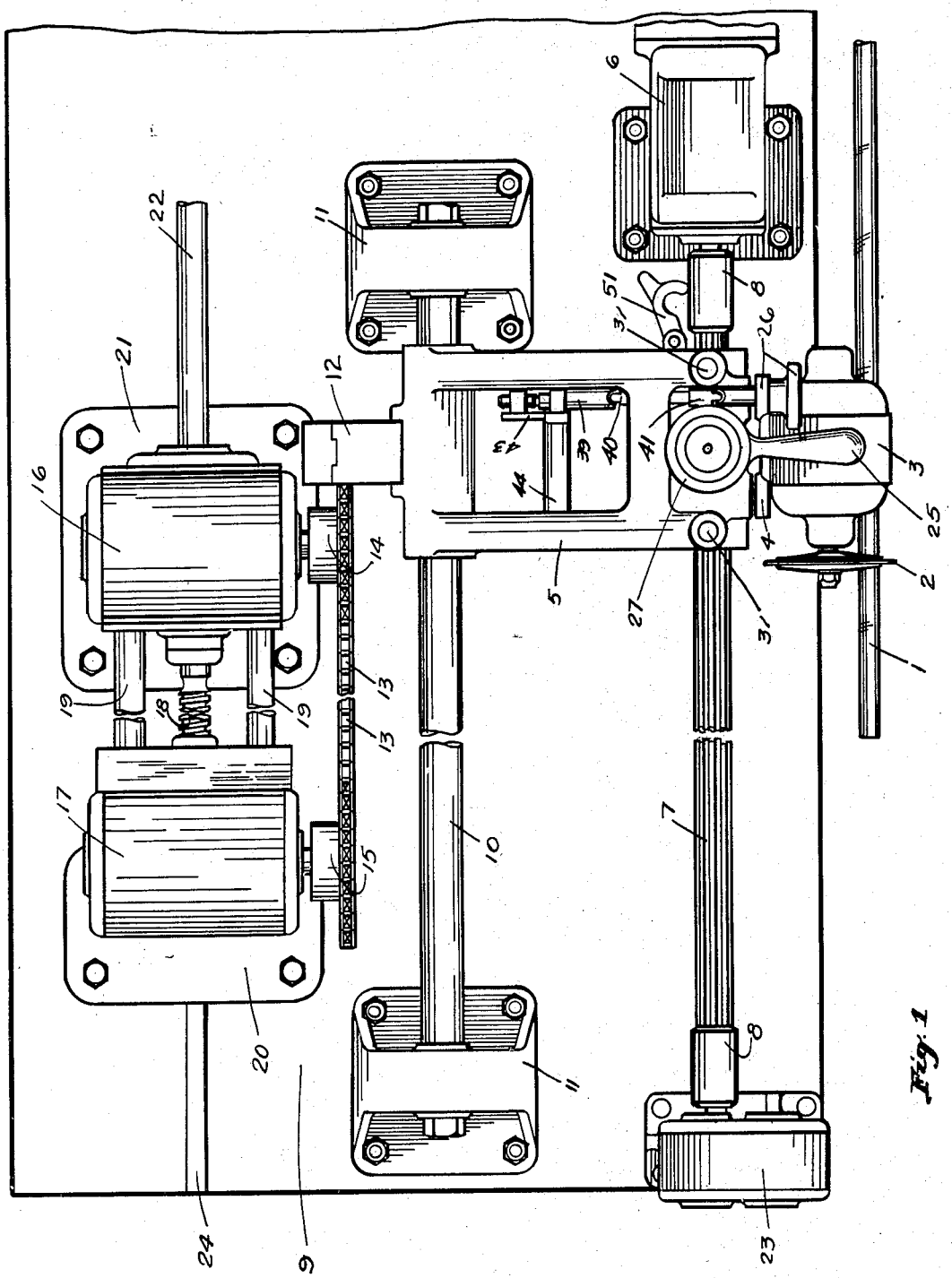
Figure 1 is a top view of the apparatus according to my invention.

In Figure 1, the tubing 1 is cut by the cutting wheel 2. The cutter wheel 2 is driven by the cutter motor 3 supported from the motor cutter carriage 4. The carriage 5 moves from its position shown in Figure 1 along the ways 10 and the splined shaft 7 and returns to this position during each revolution of the splined shaft and during each cut of the cutter 2. This splined shaft 7 is driven by the gears in the gear change box 6. The shaft 7 is connected to the gear box 6 and the gear take-off drive 23 through the flexible couplings 8. The ways 10 along which the carriage 5 moves are mounted one directly above the other on the way pedestals 11.

The carriage 5 is actuated by the roller carrying chain 13 through a roller housed in the chain roller carrier 12. This chain 13 is driven by the drive shaft 22 through the drive sprocket 14 projecting from the fixed drive housing 16. The idler sprocket 15 projects from the adjustable housing 17. The fixed drive housing 16 is mounted in a fixed manner at one end of the bar slides 19. These bar slides are bolted in the pedestal 21 which is fixed to the base plate 9. The adjustable drive housing 17 is loosely mounted on the other end of the bar slides 19 in a manner as to permit the housing to be moved forward and backward along the length of the bar slides 19. This end of the bar slides 19 is fixed to the pedestal 20. The key way 24 provides a guide in accurately mounting the assembly on the base plate 9.

When tubing of a length different than that being drawn off is desired, it may be obtained by certain adjustments which comprise a part of this invention. For example, if tubing longer than that being presently drawn off is desired, the adjusting screw 18 is adjusted to create a sufficient slack in the chain 13 to remove it from the sprockets 14 and 15. The adjusting screw 18 is then adjusted to move the adjustable housing 17 downward along the bar slides 19 to the desired position. When this position is reached, a chain of a length adequate to provide a working chain tension is set on the sprockets 14 and 15 to replace the smaller chain 13.

There is one other adjustment that must be made. Since the splined shaft 7 is geared to turn one revolution per cut, any increase in the length of the chain will result in an increase in the distance which the carriage, which is actuated by the chain, will travel. Thus it is evident that the splined shaft must be adjusted. The gear box 6 houses the splined shaft gear mechanism. By changing the ratio of the gears in the gear box, 6, we are able to maintain the desired one revolution per cut speed of the splined shaft.

Thus from Figure 1 we observe that a change in the length of tubing being cut may be accomplished by changing the roller-carrying chain 13, adjusting the adjustable screw 18 to locate the adjustable housing 17 in the newly desired position, and changing the gear ratio in the gear box 6 so that the splined shaft 7 will maintain its speed of one revolution per cut.

As was pointed out above, the cutter 2 has a vertical as well as horizontal motion thus creating an arcuate cut. If tubing of different diameters is run off, two adjustments should be made, one through the horizontal adjusting control 26 and the other through the vertical adjusting control 27. The horizontal control is locked by the horizontal locking control 25 and the vertical control is locked by the vertical locking control 51.

Figure 2, a front view of the glass cutting apparatus, shows the cutting means more clearly in its relation to the rest of the machine. As is mentioned above, there is a vertical as well as horizontal motion to the cutting wheel as it moves along with the tubing so that the resulting cut will be perpendicular to the axis of the tube instead of a helix which would result if the carriage did not move along with the tubing as it is being cut.

The horizontal motion is obtained through the contour of the cam 28 and is controlled and regulated by the horizontal adjusting control 26. The vertical motion is obtained through the contour of the cam 29 and its cam roller 30 and is controlled and regulated by the vertical adjusting control 27. The necessity for two different adjustments, one for the horizontal and one for the vertical motion will be readily appreciated by a realization that when the diameter of the tubing being cut is increased, the arc formed by the cutter in the act of cutting the tubing must be changed so that it will continue to follow the circumferential contour of the tubing. Since this arcuate motion is obtained through the cams 28 and 29 by reason of their contour, it is clear that to obtain a different arcuate motion when a different size tubing is being cut, cams of a contour capable of producing the desired arcuate motion must be used. Thus the cams 28 and 29 are taken out and replaced by cams of the desired contour.

The motor cutter carriage 4 on which the cutter motor 3 is mounted moves in an arcuate manner to permit the cutter wheel 2 to accomplish a combination horizontal and vertical cut of the tubing. The vertical motion is accomplished by the cutter carriage guide 32 sliding up and down on the bar slides 31 as the cam roller 30 follows the contour of the cam 29. The cutter carriage springs 33 serve to maintain a firm contact between the cam roller 30 and the cam 29, thus insuring the complete and accurate transmission of the motion of the cam to the cutter carriage guide 32. The manner in which the vertical motion is accomplished will appear more clearly in Figure 4.

The vertical locking control 51 attached to the carriage 5 locks the cutter carriage guide 32 in an elevated position by encircling one of the bar slides 31, thus preventing the cutter carriage guide 32 from completing its downward motion when it is desired to adjust or replace the cutter wheel. When in the locked position, the vertical cam follower 52 may be further retracted through the vertical adjusting control 27 which is attached to the vertical adjusting screw 46.

Figure 3, an end view of the machine of my invention, shows the relative position of the component parts. The fixed pedestal 20, the way pedestal 11 and the gear take-off drive 23 are mounted on the base plate 9. The bar slides 19 are set in the top of the pedestal 20 and serve to guide the adjustable housing 17 as it is adjusted through the adjustable screw 18. The chain roller carrier 12 attached to the carriage 5 houses the roller 48 which transmits the motion of the chain 13 through the idler sprocket 15 projecting from the adjustable housing 17. The way pedestal 11 supports the ways 10 along which the carriage 5 moves.

This figure also shows the location of the mechanism used to create and control the horizontal and vertical cutting apparatus which will be more fully described in Figure 5. The combination of the horizontal and vertical motion culminates in the cutter 2 describing an arc which substantially follows the circumferential contour of the tubing being cut.

In Figure 4, the motion of the drive sprocket 14 is transmitted to the carriage 5 through the roller carrying chain 13 and the roller 48 in the chain roller carrier 12 which is attached to the carriage 5. The carriage 5 is bushed so as to slide on the ways 10.

The horizontal and vertical motion is obtained from the cams 28 and 29, cam 28 having a contour such as to give the desired horizontal motion and cam 29 having a contour such as to give the desired vertical motion. These cams may be of the split cam type so as to be readily detachable in order to permit the substitution of cams of a contour adequate to produce the desired arcuate motion when tubing of a different diameter is to be cut. The split cams are bolted onto the cam adapter 49 which is broached to accommodate and slide on the splined shaft 7 thus transmitting the rotary motion of the splined shaft through the adapter to the cams.

When there is tubing of a different diameter being drawn, other changes aside from a change in the cams are necessary. Since the describing of an arc which substantially follows the circumferential contour of the tubing being cut is the desired objective in the arcuate motion of the cutter wheel, it is apparent that if larger tubing is to be drawn, the circumference of that tubing will be larger and hence a longer arc will have to be described. This is accomplished through two adjustments. The vertical adjusting screw 46 may be adjusted through the vertical motion adjusting control 27 and the horizontal adjusting screw 39 may be adjusted through the horizontal motion adjusting control 26.

Since the splined shaft 7 is geared to turn one revolution per cut of tubing, we may discover the manner in which the arcuate motion of the cutter is accomplished by studying the results which take place when the cams move through 360 degrees. The motion of the cam 29 is transmitted into the vertical motion of the cutter carriage guide 32 through the cam roller 30. The vertical motion cam 29 is synchronized with the horizontal motion cam 28 so that as the cutter carriage guide 32 moves upward as a result of the motion transmitted through the vertical cam roller 30, the cutter carriage 4 will move forward simultaneously as a result of the motion transmitted through the horizontal cam roller 34 and linkage to give a forward motion to the motor cutter carriage slide bars 45. The cutter carriage guide 32 is bushed to accommodate the motor cutter carriage slide bars 45. Thus the desired arc is described when the cutter carriage guide 32 moves upward and the slide bars 45 therethrough move forward.

The motion of the horizontal cam roller 34 is transmitted to the oscillating link 36 through the horizontal cam follower 37 and the spring 35 around their common pivot 50. The oscillating link spring 38 attached to the housing on one end and the oscillating link on the other serves as a means of insuring a firm spring contact between the cam roller 34 and the cam 28. As the cam moves through its cycle, the motion transmitted to the oscillating link 36 is in turn transmitted through the horizontal adjusting screw 39 and the saddle link 44 to push forward the motor cutter carriage slide bars 45 attached to the other end of which are the motor cutter carriage 4, the cutter motor 3 and the cutting wheel 2. The front universal joint assembly 41 and the rear universal joint assembly 40 enables adjustments to be made while the machine is in actual operation. These universal joints connect the horizontal adjusting screw 39 to the horizontal adjusting control 26.

Figures 5, 6 and 7 show in detail just how the horizontal motion is accomplished. Figure 5 shows the relative location of the horizontal motion mechanism when the cutter wheel is in its rearward position. As the cam 28 turns in a clock-wise manner, the cam roller 34, following the contour of the cam, will move forward as shown in Figure 6. This forward motion of the cam roller 34 will be transmitted into the rearward motion of the cam follower 37. This rearward motion will be transmitted into the forward motion of the oscillating link 36 through the spring 35. As the oscillating link 36 moves forward it will push forward the horizontal adjusting screw 39, the saddle link 44 and the motor cutter carriage slide bars 45, all of which are attached one to the other. After this forward motion has been completed and the desired horizontal motion attained, the horizontal motion mechanism, due to the contour of the cam which actuates it, will move in a rearward direction as shown in Figure 7 and again assume its original position as shown in Figure 5.

Figure 9 shows the horizontal locking control 25 in the position which it assumes when the horizontal locking slot guide 43 with the locking slot 42 therein locks itself about the locking pin 47. The locking slot 42 is so located at a point along the horizontal locking slot guide 43 that the act of locking must take place when the oscillating link 36 has pushed the horizontal adjusting screw 39, the saddle link 44 on which the locking pin 47 is mounted, and the motor cutter carriage slide bars 45 to their forward position as shown in Figure 8 for it is only in this position that the locking pin 47 will be far enough forward to become locked in the locking slot 42 in the horizontal locking slot guide 43. The vertical locking control 51 has been described and the manner in which it functions illustrated in the description of Figure 2 above. These two locking controls cooperate to enable the removal of the glass severing means from the path of the tubing being drawn off.

Figure 8 shows the position which the horizontal motion cam assembly assumes when it has been locked through the pin 47. It will be locked in the rearward position and the motion transmitted from the cam 29 through the cam roller 34 to the cam follower 37 will result in the expansion and contraction of the safety spring 35.

Figure 10:
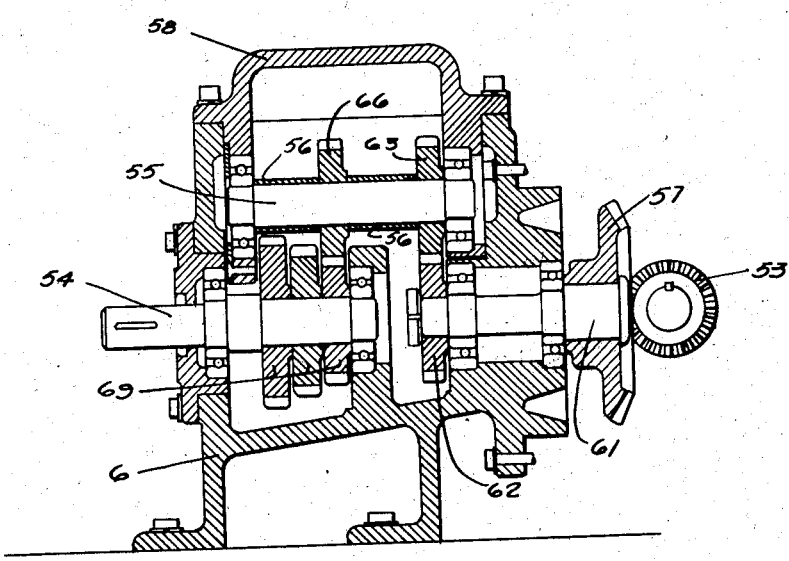
Figure 10 is a side elevational view shown in section of the gear change transmission.

Figure 10 shows the gear change box 6 which drives the splined shaft. The gears in this box are driven from the beveled gear pinion cross-drive 53 through the beveled gear 57 and its power input shaft 61. The jack shaft 55 is driven through the low ratio pinion 63 which is geared to the fixed master driving gear 62 on the end of the beveled gear power input shaft 61. The low ratio jack shaft pinion 66 is geared to its appropriate gear in the fixed cone gear assembly 60 on the power take-off shaft 54.

Figure 11:
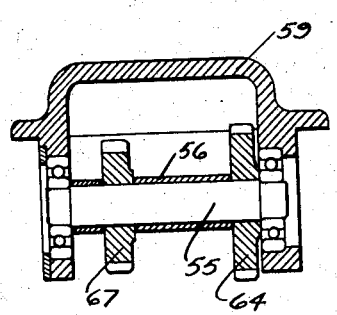
Figure 11 is a side elevational view shown in section of an alternate gear change cover.
Figure 12:
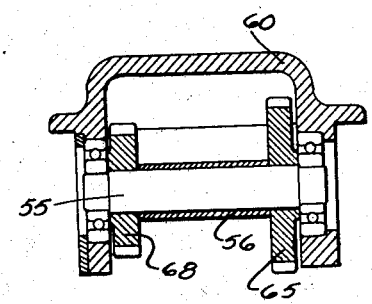
Figure 12 is a side elevational view shown in section of another alternate gear change cover.

When a change in gear ratio is desired, the gear change box cover may be replaced by a cover containing the gears of a desired ratio to a gear in the fixed cone gear assembly 69. Figure 10 shows the low ratio gear change box cover 58, Figure 11 the medium ratio gear change box cover 59, and Figure 12 the high ratio gear change box cover 60. The low ratio cover 58 encloses the low ratio jack shaft driven pinion 63 and the low ratio jack shaft driving pinion 66. Cover 59 in Figure 11 encloses the medium ratio jack shaft driven pinion 64 and the medium ratio jack shaft driving pinion 67. Cover 60 in Figure 12 encloses the high ratio jack shaft driven pinion 65 and the high ratio jack shaft driving pinion 68. Although I have illustrated but three different gear ratios, more may be included, without departing from the spirit of my invention, by merely increasing the number of gears in the fixed cone gear assembly 69 and the number of gear change box covers. All shafts are run on anti-friction bearings. All gears are keyed to their respective shafts and the driving and driven jack shaft pinions may be positioned with the aid of spacer bushings 56.

What I claim is:

1. In a machine for severing glass tubing: a cutting member; means for bodily displacing said cutting member in an arcuate path, transverse to the longitudinal axis of the said tubing; a carriage on which said cutting member is mounted; and means for reciprocating said carriage in the longitudinal direction of the tubing being cut;

and means for locking said cutting member out of the path of the tubing.

2. In a machine for severing glass tubing: a cutting member; and means for bodily displacing said cutting member in an arcuate path, transverse to the longitudinal axis of the said tubing.

3. In a machine for severing glass tubing: means for accomplishing cuts of tubing of different lengths, said means comprising; a drive shaft; a fixed drive housing into which said drive shaft projects; an adjustable housing spaced from the fixed drive housing; an adjusting screw connecting said fixed housing and said adjustable housing; a drive sprocket projecting from the fixed drive housing and in driving relationship with said drive shaft; an idler sprocket projecting from the adjustable housing; and an adjustable roller-carrying chain connected to said drive sprocket and said idler sprocket.

4. In a machine for severing glass tubing: a cutting member; means for bodily displacing said cutting member in an arcuate path, transverse to the longitudinal axis of the said tubing; a carriage on which said cutting member is mounted; and means for reciprocating said carriage in the longitudinal direction of the tubing being cut.

5. In apparatus for severing glass tubing by means of imparting a stroke to a cutting member transverse to the longitudinal axis of the glass tubing synchronously with means for reciprocating the cutting member along the longitudinal axis of said glass tubing: means for disengaging said cutting member from said means for imparting the transverse stroke without also disengaging said cutting member from said reciprocating means.

6. In apparatus for severing glass tubing, the combination: a cutting member; means for reciprocating said cutting member along the longitudinal axis of said glass tubing; means for imparting a stroke to said cutting member transverse to the longitudinal axis of said glass tubing, said stroke being synchronized with the reciprocating movement of said cutting member; and means through which said cutting member may be disengaged from said means for imparting the transverse stroke without also disengaging said cutting member from said reciprocating means.

WILLIAM P. STUCKERT.